(12) United States Patent
Cremers et al.

(10) Patent No.: US 9,948,875 B2
(45) Date of Patent: Apr. 17, 2018

(54) HIGH DYNAMIC RANGE IMAGING PIXELS WITH IMPROVED READOUT

(71) Applicant: SEMICONDUCTOR COMPONENTS INDUSTRIES, LLC, Phoenix, AZ (US)

(72) Inventors: Bart Cremers, Zonhoven (BE); Tomas Geurts, Haasrode (BE)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 15 days.

(21) Appl. No.: 15/145,626

(22) Filed: May 3, 2016

(65) Prior Publication Data

US 2017/0099446 A1 Apr. 6, 2017

Related U.S. Application Data

(60) Provisional application No. 62/235,817, filed on Oct. 1, 2015.

(51) Int. Cl.
*H04N 5/355* (2011.01)
*H04N 17/00* (2006.01)
*H04N 5/378* (2011.01)
*H04N 5/3745* (2011.01)

(52) U.S. Cl.
CPC ........... *H04N 5/3559* (2013.01); *H04N 5/378* (2013.01); *H04N 5/37452* (2013.01); *H04N 17/002* (2013.01)

(58) Field of Classification Search
CPC .............. H04N 5/3559; H04N 5/37452; H04N 17/002; H04N 5/378
See application file for complete search history.

(56) References Cited

U.S. PATENT DOCUMENTS

| | | |
|---|---|---|
| 7,075,049 B2 | 7/2006 | Rhodes et al. |
| 7,432,540 B2 | 10/2008 | McKee |
| 7,718,459 B2 | 5/2010 | Patrick et al. |
| 7,728,896 B2 | 6/2010 | McKee |
| 8,077,237 B2 | 12/2011 | Li |
| 2009/0237540 A1 | 9/2009 | Johnson |
| 2014/0078368 A1* | 3/2014 | Komori ............... H04N 5/3745 348/307 |

* cited by examiner

*Primary Examiner* — Twyler Haskins
*Assistant Examiner* — Carramah J Quiett
(74) *Attorney, Agent, or Firm* — Treyz Law Group, P.C.; Joseph F. Guihan; David K. Cole

(57) ABSTRACT

An imaging system may include an image sensor having an array of dual gain pixels. Each pixel may be operated using an improved three read method and an improved four read method such that all signals are read in a high gain configuration in order to prevent electrical offset in signal levels. Each pixel may be operated using an improved three read, two analog to digital conversion (ADC) method in which a frame buffer is used to store calibration data. Each pixel may be operated using an improved three read, three ADC method in which no frame buffer is required. A high dynamic range image signal may be produced for each pixel based on signals read from the pixel and on light conditions.

17 Claims, 16 Drawing Sheets

HIGH DYNAMIC RANGE IMAGING PIXELS WITH IMPROVED READOUT

This application claims benefit of and claims priority to provisional patent application No. 62/235,817, filed Oct. 1, 2015, which is hereby incorporated by reference herein in its entirety.

BACKGROUND

This relates generally to image sensors, and more specifically, to methods and circuitry for operating image sensor pixels with dual-gain readout for producing high dynamic range (HDR) images.

In conventional imaging systems, image artifacts may be caused by moving objects, moving or shaking camera, flickering lighting, and objects with changing illumination in an image frame. Such artifacts may include, for example, missing parts of an object, edge color artifacts, and object distortion. Examples of objects with changing illumination include light-emitting diode (LED) traffic signs (which can flicker several hundred times per second) and LED brake lights or headlights of modern cars.

While electronic rolling shutter and global shutter modes produce images with different artifacts, the root cause for such artifacts is common for both modes of operation. Typically, image sensors acquire light asynchronously relative to the scenery being captured. This means that portions of an image frame may not be exposed for part of the frame duration. This is especially true for bright scenery when integration times are much shorter than the frame time used. Zones in an image frame that are not fully exposed to dynamic scenery may result in object distortion, ghosting effects, and color artifacts when the scenery includes moving or fast-changing objects. Similar effects may be observed when the camera is moving or shaking during image capture operations.

Conventional imaging systems also may have images with artifacts associated with low dynamic range. Scenes with bright and dark portions may produce artifacts in conventional image sensors, as portions of the image may be over exposed or under exposed.

Dual gain pixels are commonly used to improve the dynamic range of an image sensor. They can be used either in a fixed high or fixed low gain readout mode or in a dual readout mode where both gain modes are read out. In the dual readout mode, charge is either stored entirely on the photodiode or is allowed to overflow to a floating diffusion node during integration. The combination of dual gain readout with overflow during integration allows for the largest dynamic range increase.

Dual gain pixels traditionally read out captured high-gain and low-gain image data in respective high-gain and low-gain configurations. Switching between the high-gain configuration and the low-gain configuration results in electrical crosstalk. This crosstalk causes an undesirable large electrical offset between signals read in the high-gain configuration and signals read in the low-gain configuration. This electrical offset can cause pixel output signals to have a magnitude that is outside of the operating range of analog readout circuitry in the imaging system.

Dual gain pixels traditionally read out captured image data using a method that requires either four pixel read operations and analog to digital conversions (ADCs) to operate without a frame buffer, or three pixel reads and three ADCs to operate with a frame buffer. In the latter case, the frame buffer is required to provide a reference image for offset correction between signals. Performing additional reads and ADC conversions requires additional power, whereas the introduction of a frame buffer requires additional hardware. Such increased power consumption and addition of hardware is generally undesirable.

It would therefore be desirable to be able to provide high dynamic range (HDR) image sensors that do not have a large electrical offset between pixel output signals, that require fewer reads and ADC conversions than traditional image sensors, and that do not require a frame buffer for pixel readout.

DETAILED DESCRIPTION

Embodiments of the present invention relate to image sensors, and more particularly, to image sensors having dual gain pixels with high dynamic range (HDR) output signals. It will be recognized by one skilled in the art, that the present exemplary embodiments may be practiced without some or all of these specific details. In other instances, well known operations have not been described in detail in order to not unnecessarily obscure the present embodiments.

Imaging systems having digital camera modules are widely used in electronic devices such as digital cameras, computers, cellular telephones, and other electronic devices. A digital camera module may include one or more image sensors that gather incoming light to capture an image.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc.

In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may activate braking, active steering, or other active collision avoidance measures. A vehicle safety system may use continuously captured images from an imaging system having a digital camera module to help avoid collisions with objects (e.g., other automobiles or other environmental objects), to help avoid unintended drifting (e.g., crossing lane markers) or to otherwise assist in the safe operation of a vehicle during any normal operation mode of the vehicle.

Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels).

Image sensor pixels may be dual gain pixels that use additional transistors and storage regions along with dual gain readout methods to improve the dynamic range of the pixel. The dual gain readout methods used may be adjusted to reduce electrical offset between pixel output signals, reduce the number of analog to digital conversions (ADCs) required for readout, and remove the need for a frame buffer.

Figure 1:
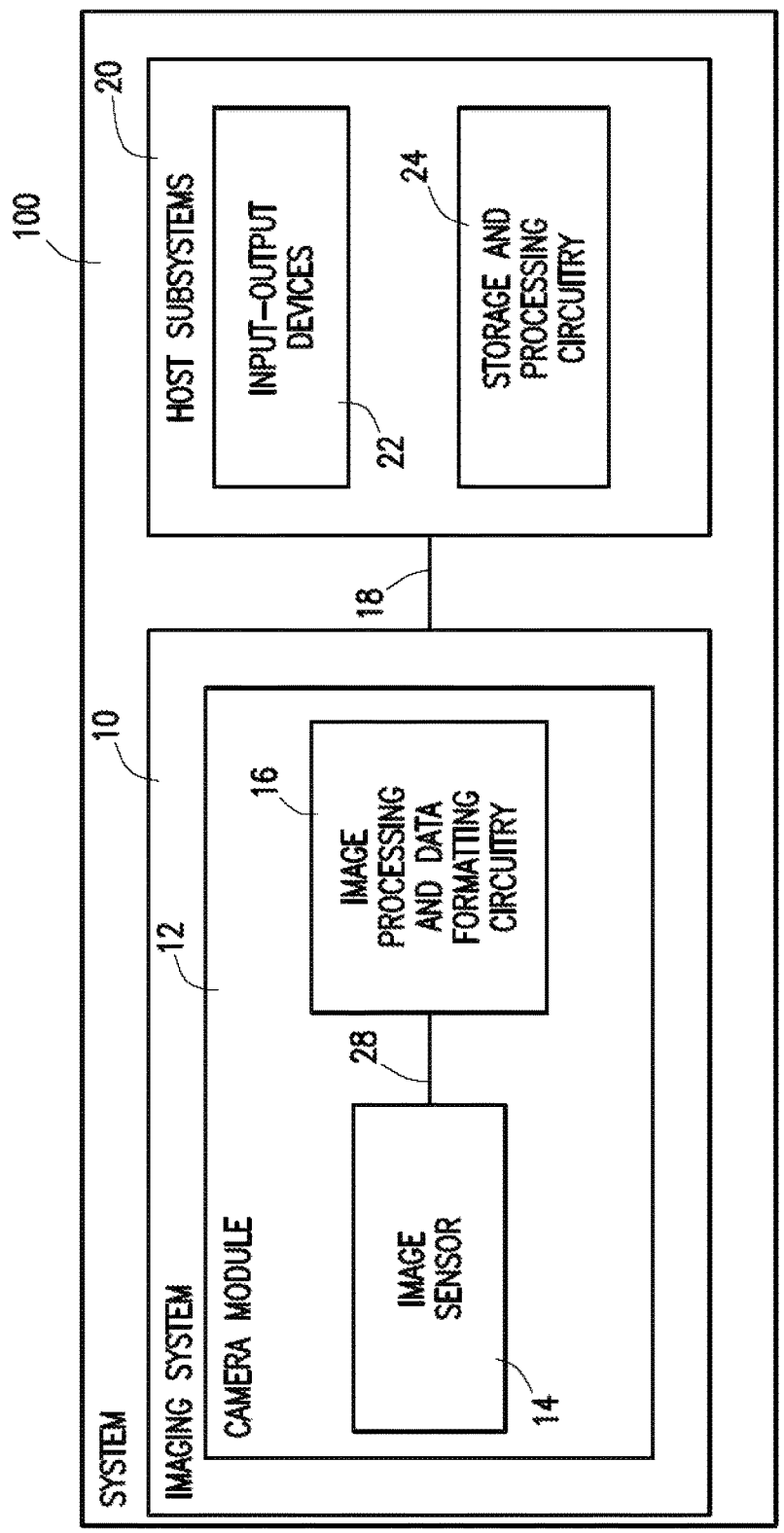
FIG. 1 is a diagram of an illustrative electronic device having an image sensor in accordance with an embodiment.

FIG. 1 is a diagram of an illustrative imaging and response system including an imaging system that uses an image sensor to capture images. System 100 of FIG. 1 may be a vehicle safety system (e.g., an active braking system or other vehicle safety system), may be a surveillance system, or may be an electronic device such as a camera, a cellular telephone, a video camera, or other electronic device that captures digital image data.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses. The lenses in camera module 12 may, as an example, include M*N individual lenses arranged in an M×N array. Individual image sensors 14 may be arranged in a corresponding M×N image sensor array (as an example). The values of M and N may each be equal to or greater than one, may each be equal to or greater than two, may exceed 10, or may have any other suitable values.

Each image sensor in camera module 12 may be identical or there may be different types of image sensors in a given image sensor array integrated circuit. Each image sensor may be a Video Graphics Array (VGA) sensor with a resolution of 480×640 image sensor pixels (as an example). Other arrangements of image sensor pixels may also be used for the image sensors if desired. For example, images sensors with greater than VGA resolution (e.g., high-definition image sensors), less than VGA resolution and/or image sensor arrays in which the image sensors are not all identical may be used.

During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), address circuitry, etc.

Still and video image data from camera sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include an active control system that delivers control signals for controlling vehicle functions such as braking or steering to external devices. Host subsystem 20 may include processing software for detecting objects in images, detecting motion of objects between image frames, determining distances to objects in images, filtering or otherwise processing images provided by imaging system 10. Host subsystem 20 may include a warning system configured to disable imaging system 10 and/or generate a warning (e.g., a warning light on an automobile dashboard, an audible warning or other warning) in the event that verification image data associated with an image sensor indicates that the image sensor is not functioning properly.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid-state drives, etc.). Storage and processing circuitry 24 may also include microprocessors, microcontrollers, digital signal processors, application specific integrated circuits, etc.

During operation of imaging system 10, camera module 12 may continuously capture and provide image frames to host subsystem 20. During image capture operations, verification circuitry associated with image sensor 14 may be occasionally operated (e.g., following each image frame capture, following every other image frame capture, following every fifth image frame capture, during a portion of an image frame capture, etc.). Images captured when verification circuitry is operated may include verification image data containing verification information. Verification image data may be provided to image processing circuitry 16 and/or storage and processing circuitry 24. Image processing circuitry 16 may be configured to compare the verification image data to a predetermined data set stored on image processing circuitry 16. Following the comparison, image processing circuitry 16 may send status information or other verification information to host subsystem 20.

Figure 2:
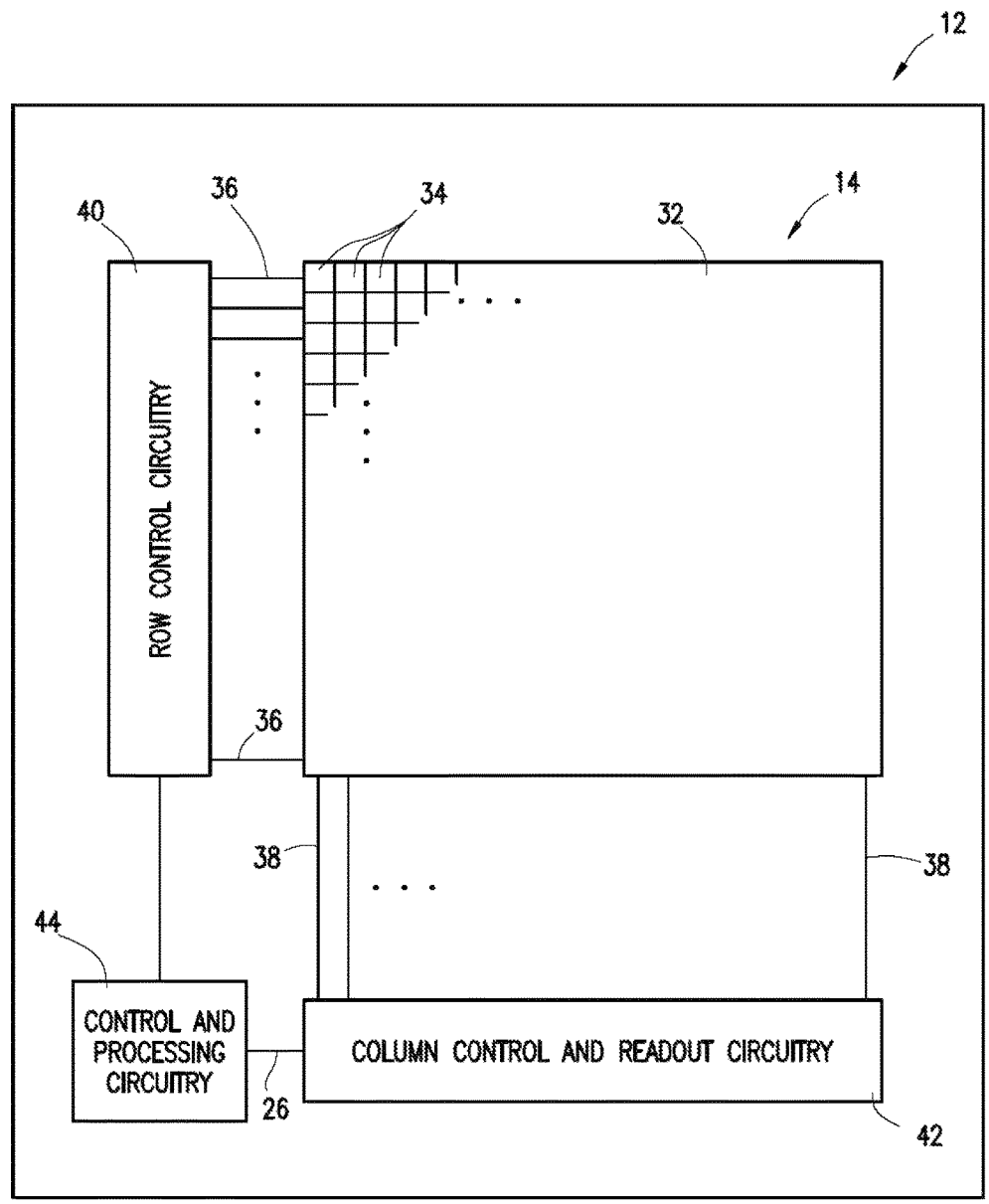
FIG. 2 is a diagram of an illustrative pixel array and associated readout circuitry for reading out image signals in an image sensor in accordance with an embodiment.

An example of an arrangement for camera module 12 of FIG. 1 is shown in FIG. 2. As shown in FIG. 2, camera module 12 includes image sensor 14 and control and processing circuitry 44. Control and processing circuitry 44 may correspond to image processing and data formatting circuitry 16 in FIG. 1. Image sensor 14 may include a pixel array such as array 32 of pixels 34 (sometimes referred to herein as image sensor pixels or image pixels 34). Control and processing circuitry 44 may be coupled to row control circuitry 40 and may be coupled to column control and readout circuitry 42 via global data path 28. Row control circuitry 40 may receive row addresses from control and processing circuitry 44 and may supply corresponding row control signals to image pixels 34 over control paths 36 (e.g., dual conversion gain control signals, pixel reset control signals, charge transfer control signals, blooming control signals, row select control signals, or any other desired pixel control signals). Column control and readout circuitry 42 may be coupled to the columns of pixel array 32 via one or more conductive lines such as column lines 38. Column lines 38 may be coupled to each column of image pixels 34 in image pixel array 32 (e.g., each column of pixels may be coupled to a corresponding column line 38). Column lines 38 may be used for reading out image signals from image pixels 34 and for supplying bias signals (e.g., bias currents or bias voltages) to image pixels 34. During image pixel readout operations, a pixel row in image pixel array 32 may be selected using row control circuitry 40 and image data associated with image pixels 34 of that pixel row may be read out by column control and readout circuitry 42 on column lines 38.

Column control and readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and column memory for storing the read out signals and any other desired data. Column control and readout circuitry 42 may output digital pixel values to control and processing circuitry 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

If desired, array 32 may be part of a stacked-die arrangement in which pixels 34 of array 32 are split between two or more stacked substrates. In such an arrangement, each of the pixels 34 in the array 32 may be split between the two dies at any desired node within pixel. As an example, a node such as the floating diffusion node may be formed across two dies. Pixel circuitry that includes the photodiode and the circuitry coupled between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any known metal-to-metal bonding technique, such as soldering or welding.

As mentioned above, the desired node in the pixel circuit that is split across the two dies may be a floating diffusion node. Alternatively, the node between a floating diffusion region and the gate of a source follower transistor (i.e., the floating diffusion node may be formed on the first die on which the photodiode is formed, while the coupling structure may connect the floating diffusion node to the source follower transistor on the second die), the node between a floating diffusion region and a source-drain node of a transfer transistor (i.e., the floating diffusion node may be formed on the second die on which the photodiode is not located), the node between a source-drain node of a source-follower transistor and a row select transistor, or any other desired node of the pixel circuit.

Figure 3:
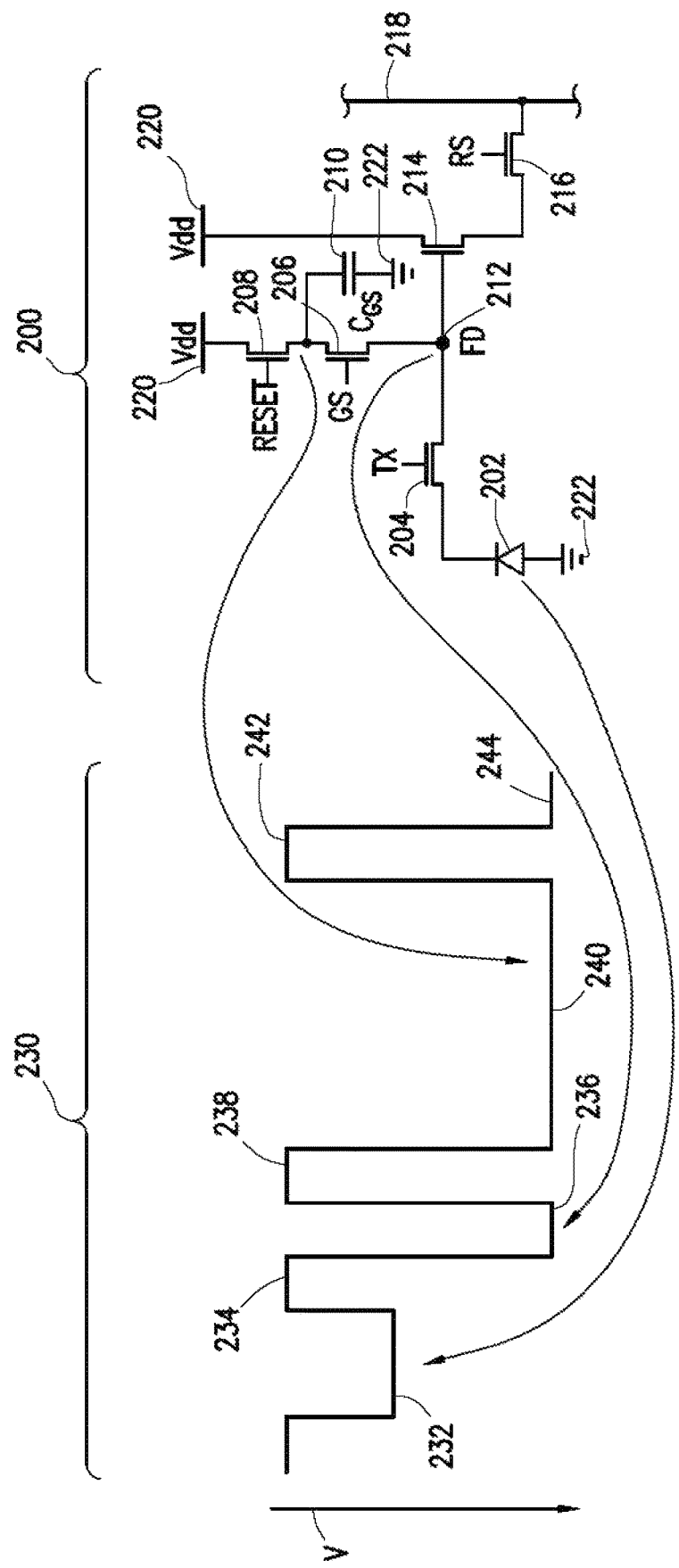
FIG. 3 is a circuit diagram of a dual gain image pixel and a corresponding potential diagram.

FIG. 3 is a circuit diagram of a dual gain image pixel and a corresponding potential diagram. As shown in FIG. 3, dual gain image pixel 200 includes photosensitive element 202 (e.g., photodiode) having a first terminal coupled to ground 222 and a second terminal coupled to floating diffusion node (FD) 212 through transfer transistor 204. Floating diffusion node 212 is coupled to voltage supply 220 through gain select transistor 206 and reset transistor 208. Gain select capacitor 210 has a capacitance $C_{GS}$ and has a first terminal coupled to ground 222 and a second terminal coupled to a node that is interposed between gain select transistor 206 and reset transistor 208. If desired, the first terminal of gain select capacitor 210 may instead be coupled to a fixed potential (not shown). Source-follower transistor 214 has a gate terminal coupled to floating diffusion node 212, a first source-drain terminal coupled to voltage supply 220, and a second source-drain terminal coupled to column output line 218 through row select transistor 216.

A gate terminal of transfer transistor 204 receives control signal TX. A gate terminal of gain select transistor 206 receives control signal GS. A gate terminal of reset transistor 208 receives control signal RESET. A gate terminal of row select transistor 216 receives control signal RS. Voltage supply 220 provides a voltage Vdd. Control signals TX, GS, RESET, and RS are provided by row control circuitry such as row control circuitry 40 in FIG. 2.

Figure 4:
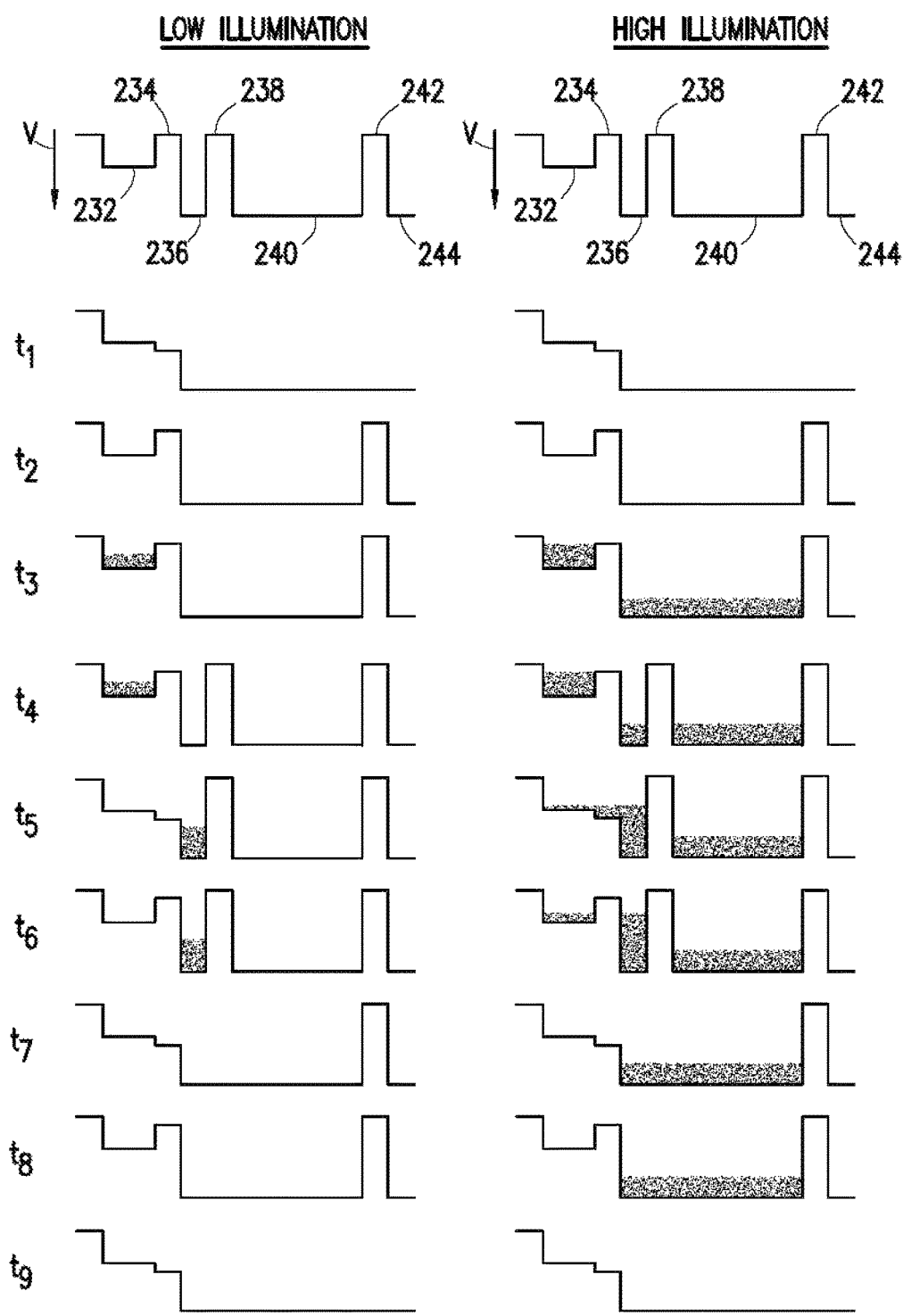
FIG. 4 is a series of potential diagrams illustrating potential levels and the flow of charge through the circuit of FIG. 3 in a three read method of operation in high illumination and low illumination conditions.
Figure 8:
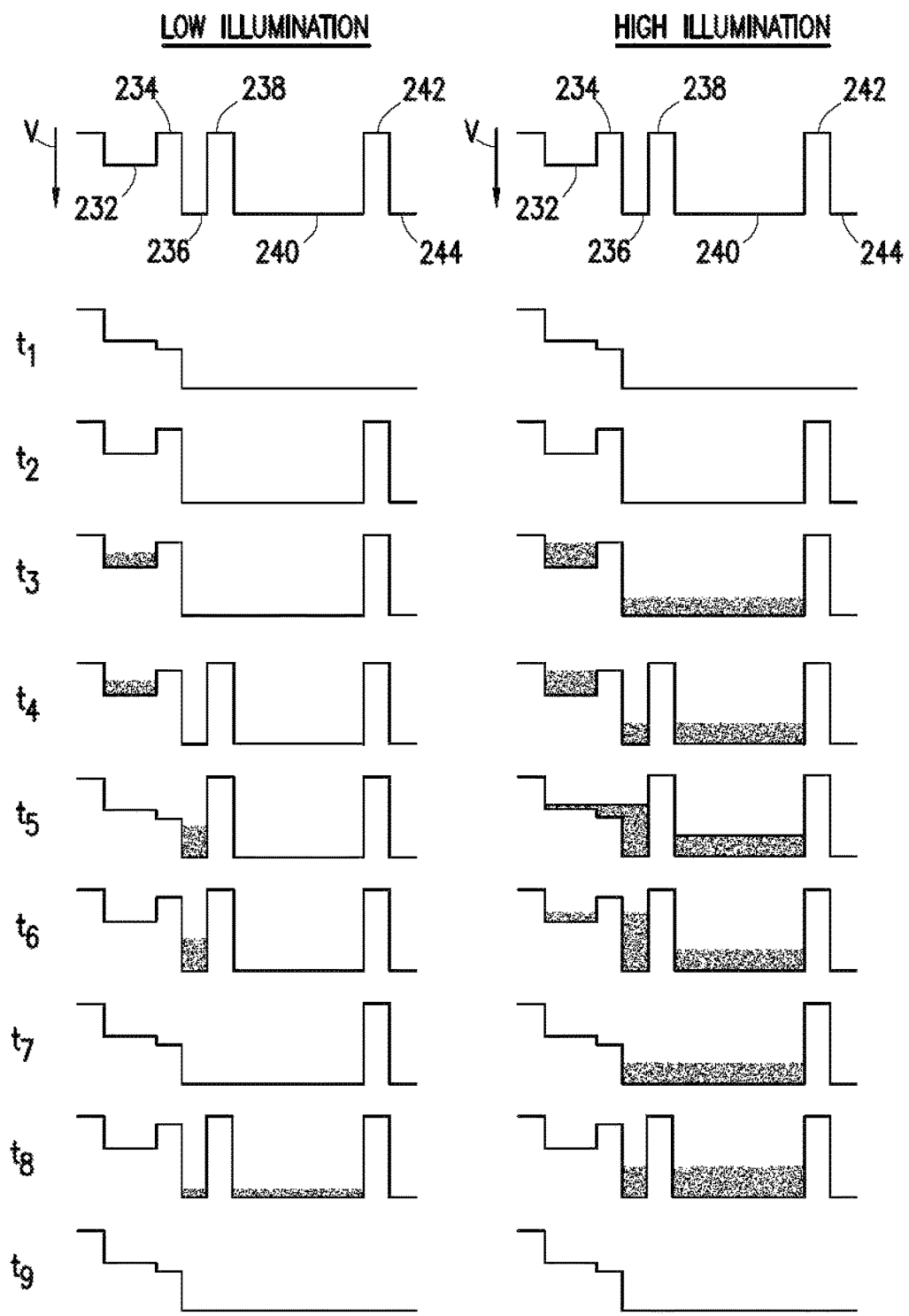
FIG. 8 is a series of potential diagrams illustrating potential levels and the flow of charge through the circuit of FIG. 3 in an improved three read method of operation in high illumination and low illumination conditions in accordance with an embodiment.
Figure 13:
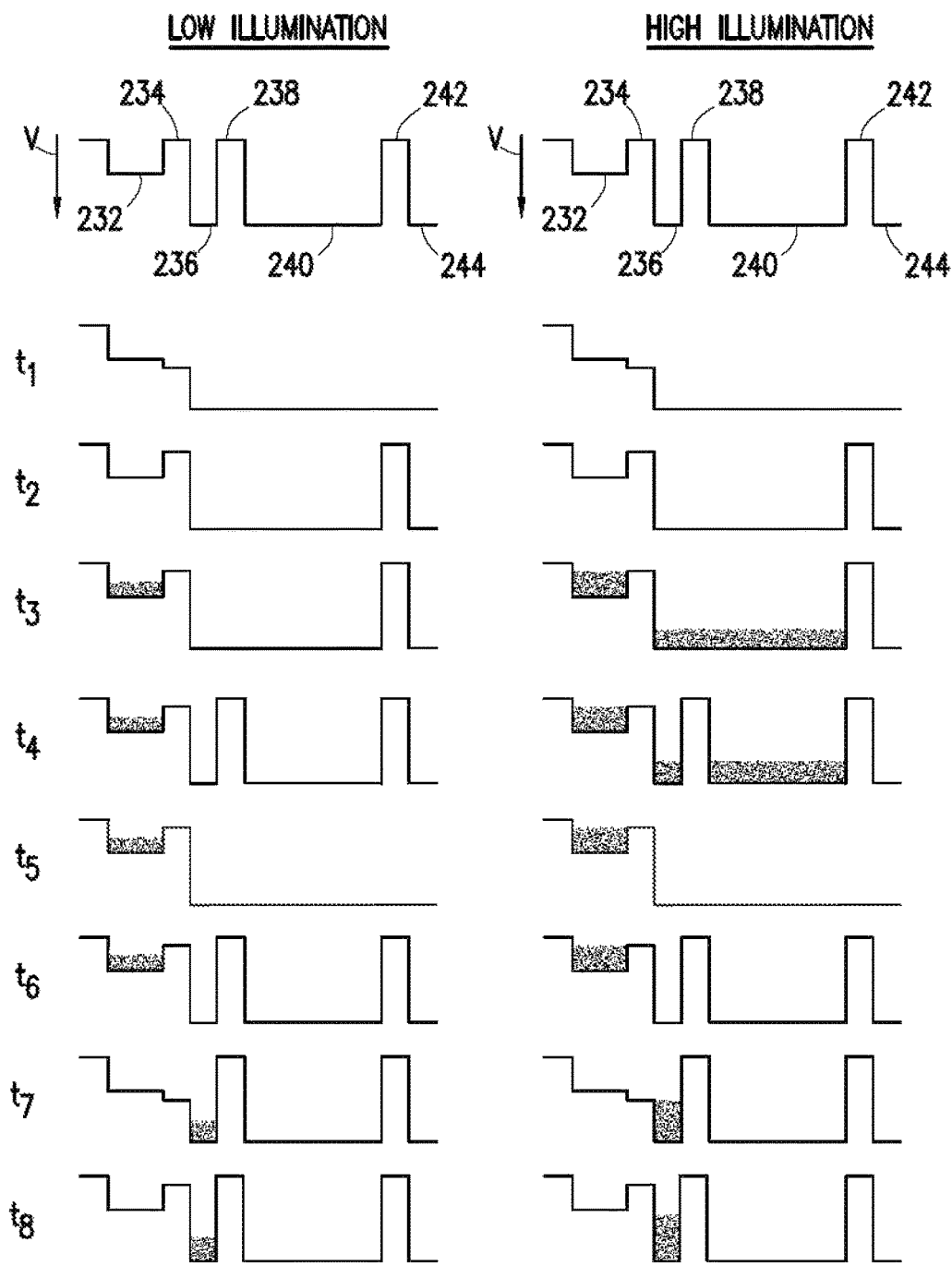
FIG. 13 is a series of potential diagrams illustrating potential levels and the flow of charge through the circuit of FIG. 3 in an improved three read method of operation in high illumination and low illumination conditions that either requires fewer analog-to-digital conversions or eliminates the need for a frame buffer in accordance with an embodiment.

Potential diagram 230 shown in FIG. 3 corresponds to the voltage level (V) at different locations within dual gain pixel 200 and is used to illustrate voltage and charge levels at these locations during pixel operation in FIGS. 4, 8, and 13. Photodiode region 232 corresponds to the voltage level at photodiode 202. Transfer region 234 corresponds to the voltage level at transfer transistor 204. Floating diffusion region 236 corresponds to the voltage level at floating diffusion node 212. Gain select transistor region 238 corresponds to the voltage level at gain select transistor 206. Gain select storage region 240 corresponds to the voltage level at gain select capacitor 210. Reset region 242 corresponds to the voltage level at reset transistor 208. Voltage supply region 244 corresponds to the voltage level at voltage supply 220. Charge (represented by darkened regions in FIGS. 4, 8, and 13) accumulates in photodiode region 232 during photodiode integration and is transferred to regions 236 and 240 during charge transfer and signal readout operations.

Figure 5:
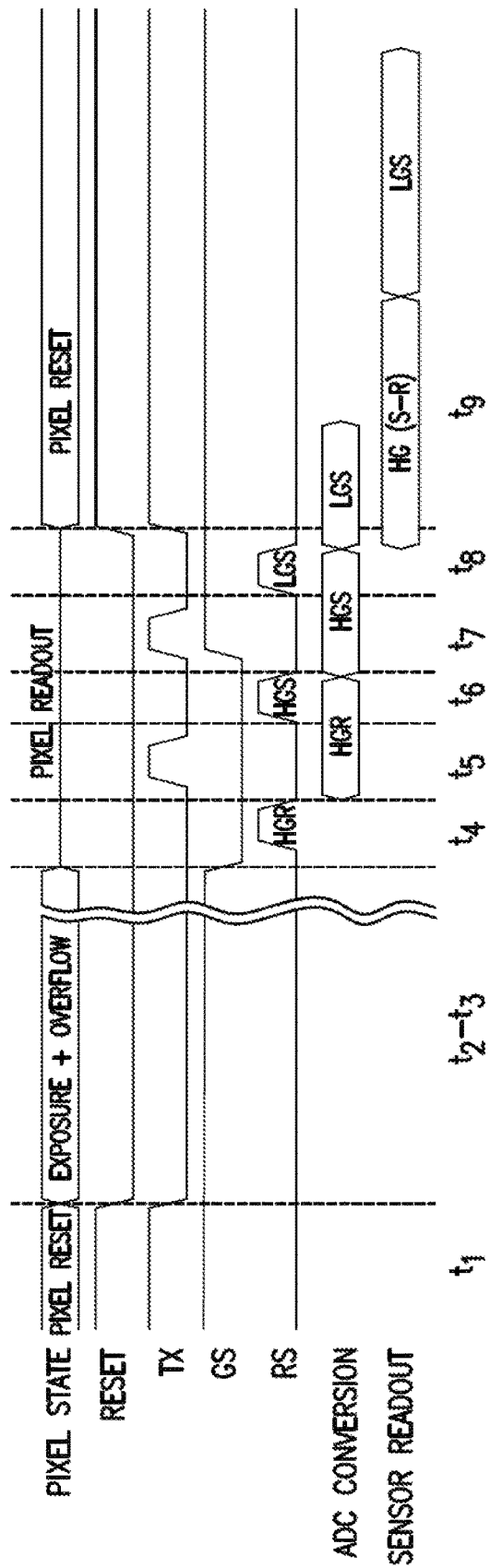
FIG. 5 is a timing diagram illustrating the state of the pixel, the timing of control signals, and the timing of analog-to-digital conversions and sensor readout operations in the circuit of FIG. 3 in the three read method of operation of FIG. 4.

FIG. 4 shows a series of potential diagrams that correspond to potential diagram 230 in FIG. 3 and that illustrate potential levels in dual gain pixel 200 at various time periods during a three read method of operation of dual gain pixel 200 in both low illumination conditions and high illumination conditions. FIG. 5 shows a timing diagram for the three read method of operation of dual gain pixel 200. The timing diagram of FIG. 5 illustrates the state of pixel 200, the timing of control signals RESET, TX, GS, and RS, and the timing of ADCs and sensor readout operations of the image sensor that contains dual gain pixel 200. The timing diagram of FIG. 5 corresponds to the potential diagrams of FIG. 4. At time period $t_1$, signals TX, GS, and RESET are asserted such that regions 234, 238, and 242 are set to a high voltage level in order to reset pixel 200. At time period $t_2$, TX and RESET are asserted such that regions 234 and 242 are set to a low voltage level. Pixel exposure and overflow occurs at time periods $t_2$-$t_3$. Time period $t_2$ represents the beginning of photodiode charge integration. Time period $t_3$ represents the end of photodiode charge integration. In low illumination conditions, all charge is contained within photodiode region 232 at time period $t_3$, and no overflow occurs. In high illumination, accumulated charge exceeds the capacity of photodiode region 232 and overflows from photodiode region 232 into floating diffusion region 236 and gain select storage region 240 at time period $t_3$.

Pixel readout occurs during time periods $t_4$-$t_8$. At time period $t_4$, control signal RS is pulsed while signals RESET, TX, and GS are deasserted (i.e., while pixel 200 is in a high gain configuration) in order to read the high gain reset voltage HGR. In low illumination conditions in which no charge has overflowed, accumulated charge will remain in photodiode region 232 and will not contribute to HGR. In high illumination conditions, overflow charge in floating diffusion region 236 will contribute to HGR. At time $t_5$, signal TX is asserted while signals GS and RESET are deasserted in order to transfer charge from photodiode region 232 to floating diffusion region 236. In low illumination conditions, charge on the photodiode is completely transferred, while in high illumination conditions, some charge remains in photodiode region 232. At time period $t_6$, signal RS is pulsed while signals RESET, TX, and GS are deasserted in order to read the high gain signal voltage HGS. At time period $t_7$, signals TX and GS are asserted while signal RESET is deasserted such that any charge remaining in photodiode region 232 is distributed between floating diffusion region 236 and gain select region 240. At time period $t_8$, signal RS is pulsed while signal GS is asserted and signals RESET and TX are deasserted (i.e., while pixel 200 is in a low gain configuration) in order to read the low gain signal voltage LGS. Pixel reset occurs again at time period $t_9$. During time period $t_9$, signals RESET, TX, and GS remain asserted until a new pixel exposure and overflow period begins.

As shown in FIG. 5, three ADCs and two sensor readout operations are performed by the image sensor that contains dual gain pixel 200 for each captured image. HGR, HGS, and LGS are each respectively converted from analog to digital signals immediately after being read. Once the HGR and HGS signals have undergone ADC processing, a high gain signal HG(S-R) is generated by subtracting HGR from HGS and is then read out from the image sensor. After the readout of HG(S-R), LGS is read out from the image sensor.

It should be noted that no low gain reset voltage is read during the pixel operation of FIG. 5. Instead, a frame buffer is used to store a calibration voltage CAL that corresponds to the voltage on the floating diffusion node during pixel reset. CAL is subtracted from LGS during downstream processing to generate a low gain signal. The inclusion of this frame buffer requires additional hardware to be included in the image sensor, but reduces the number of reads that need to be performed for each captured image.

Figure 6:
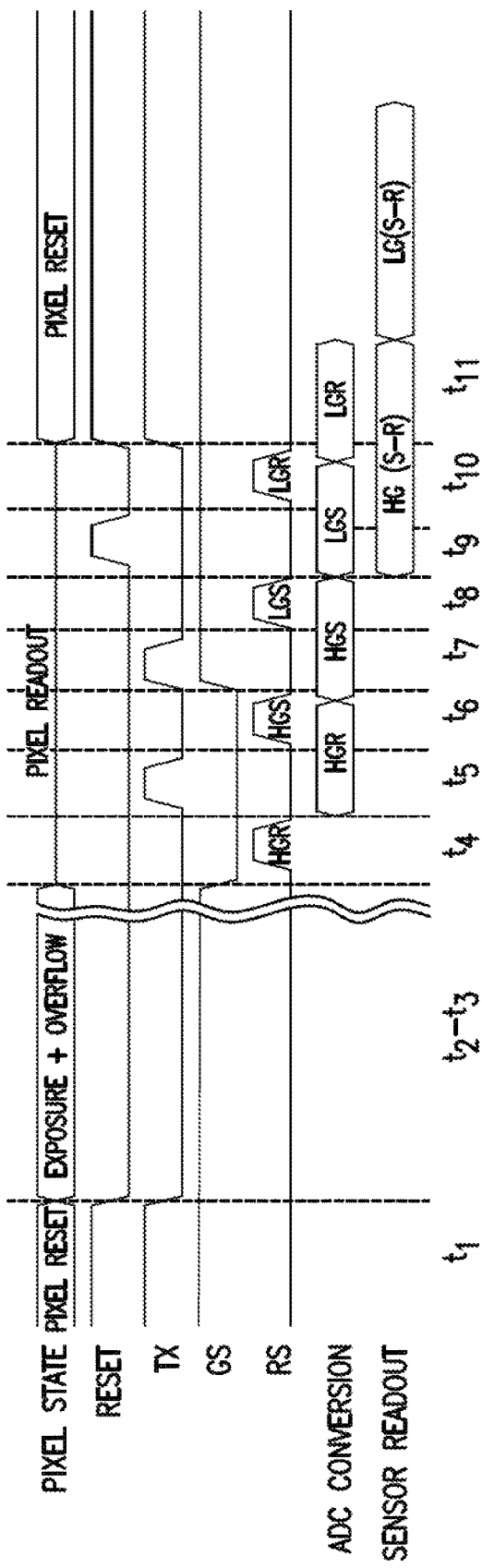
FIG. 6 is a timing diagram illustrating the state of the pixel, the timing of control signals, and the timing of analog-to-digital conversions and sensor readout operations in the circuit of FIG. 3 in a four read method of operation.

FIG. 6 shows a timing diagram for a four read method of operation of dual gain pixel 200. The timing diagram of FIG. 6 illustrates the state of pixel 200, the timing of control signals RESET, TX, GS, and RS, and the timing of ADCs and sensor readout operations of the image sensor that contains dual gain pixel 200. Operations of the four read method that occur during time periods $t_1$-$t_8$ are substantially the same as those described above in connection with FIG. 5 and descriptions of these operations are not repeated here for the sake of brevity. In the four-read method of FIG. 6, pixel readout does not end with the readout of LGS. Instead, at time period $t_9$, signals RESET and GS may be asserted while signals TX and RS are deasserted in order to reset pixel 200 to voltage Vdd. At time period $t_{10}$, signal RS is pulsed while signal GS is asserted and while signals TX and RESET are deasserted in order to read out low gain reset voltage LGR. Pixel reset occurs during time period $t_{11}$. During time period $t_{11}$, signals RESET, TX, and GS remain asserted until a new pixel exposure and overflow period begins.

As shown in FIG. 6, four ADCs and two sensor readout operations are performed by the image sensor that contains dual gain pixel 200 for each captured image. HGR, HGS, LGS, and LGR are each respectively converted from analog to digital signals immediately after being read. Once the HGR and HGS signals have undergone ADC processing, a high gain signal HG(S-R) is generated by subtracting HGR from HGS and is then read out from the image sensor. After the readout of HG(S-R), a low gain signal LG(S-R) is generated by subtracting LGR from LGS and is then read out from the image sensor.

It should be noted that, in the four read method of FIG. 6, low gain signal LG(S-R) is generated based partly on low gain reset voltage LGR that is read at time $t_{10}$, not based on a stored calibration signal (e.g., signal CAL described above in connection with FIG. 5). This eliminates the need for a frame buffer to store a calibration signal. This method increases the number of reads required for each captured image, but does not require any additional hardware for a frame buffer.

Figure 7:
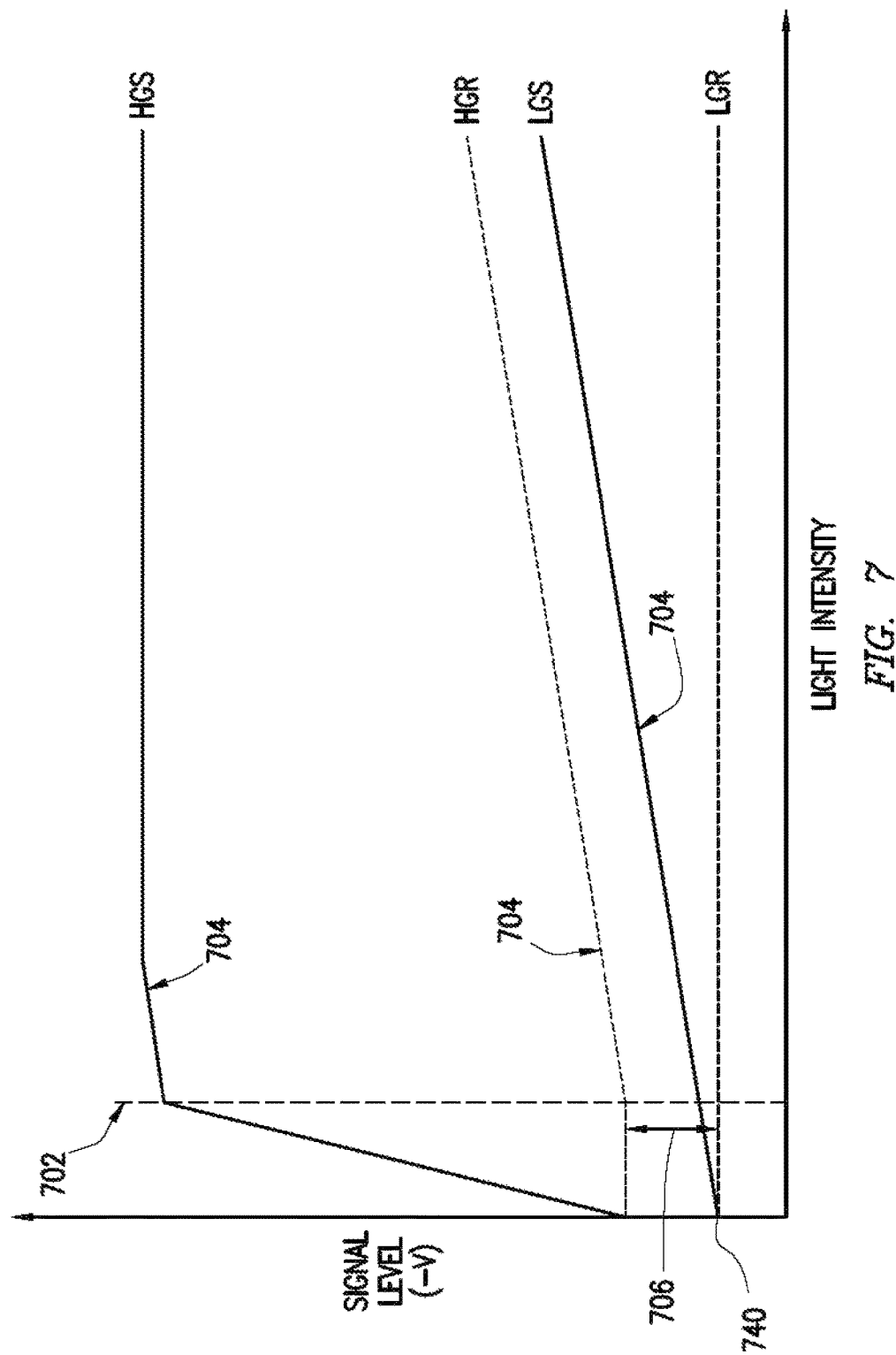
FIG. 7 is a chart illustrating light intensity vs. signal level of pixel output signals corresponding to the three/four read methods of operation of FIGS. 5 and 6.

FIG. 7 is a chart illustrating light intensity vs. signal level (-V) of signals read using the three/four read methods of operation of FIGS. 4-6. Charge overflow occurs at light intensity level 702. In the three read method of operation of FIGS. 4 and 5, a calibration signal CAL corresponding to voltage 740 may be stored in a frame buffer instead of reading signal LGR. Signals HGR and LGS and a portion of signal HGS have the same gradient 704 for light intensities over level 702, however signal HGS becomes clipped once light intensity is large enough in magnitude to create an HGS signal that is outside of the operating range of analog readout chains in the image sensor. Signals HGS and HGR are read in a high gain configuration, whereas signals LGS and LGR are read out in a low gain configuration. By reading signals HGS and HGR and signals LGS and LGR in different configurations, electrical offset 706 is created, which undesirably increases the overall voltage range of the read signals. In particular, electrical offset 706 is contributed to by crosstalk generated by gain select transistor 206. This electrical offset makes it more difficult to optimize pixel output signals to fit within the operational signal range of the analog readout chains in the image sensor. It would therefore be desirable to remove this electrical offset.

Figure 9:
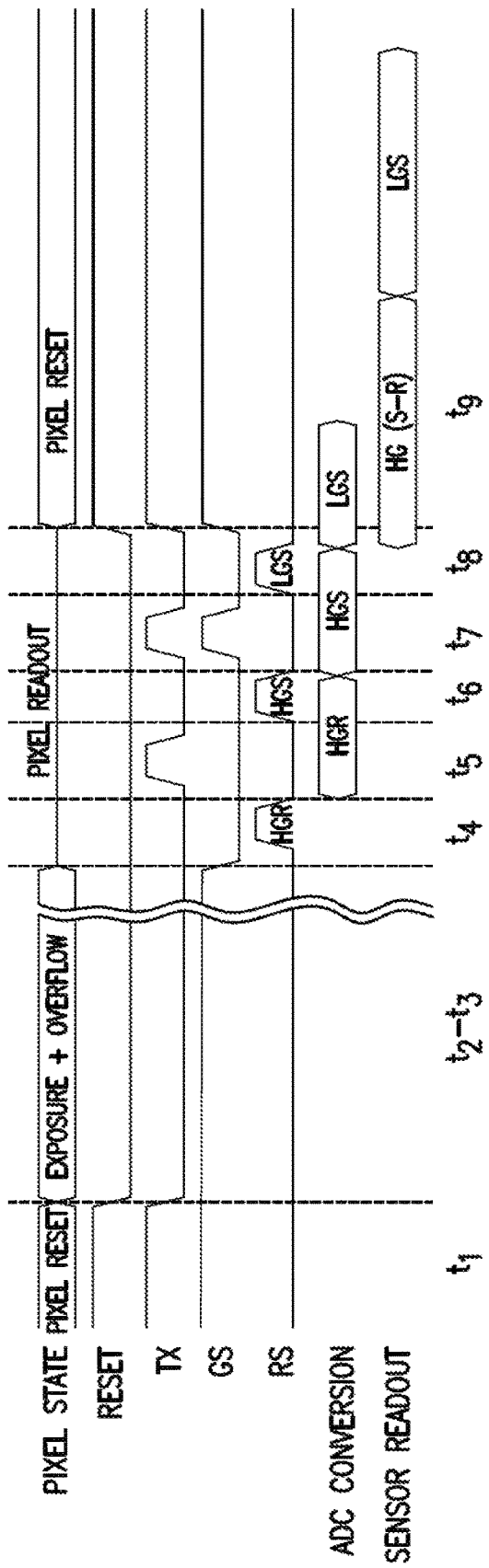
FIG. 9 is a timing diagram illustrating the state of the pixel, the timing of control signals, and the timing of analog-to-digital conversions and sensor readout operations in the circuit of FIG. 3 in the improved three read method of operation of FIG. 8 in accordance with an embodiment.

FIG. 8 shows a series of potential diagrams that correspond to potential diagram 230 in FIG. 3 and that illustrate potential levels in dual gain pixel 200 at various time periods during an improved three read method of operation of dual gain pixel 200 in both low illumination conditions and high illumination conditions. FIG. 9 shows a timing diagram for the improved three read method of operation of dual gain pixel 200 of FIG. 8. The timing diagram of FIG. 9 illustrates the state of pixel 200, the timing of control signals RESET, TX, GS, and RS, and the timing of ADCs and sensor readout operations of the image sensor that contains dual gain pixel 200. The timing diagram of FIG. 9 may correspond to the potential diagrams of FIG. 8. Operations of the improved three read method that occur during time periods $t_1$-$t_7$, ADC conversion operations, and sensor readout operations may be substantially the same as those described above in connection with FIG. 5 and descriptions of these operations are not repeated here for the sake of brevity. In the improved three read method of FIGS. 8 and 9, LGS may be read out from pixel 200 in high gain configuration. At time period $t_8$, signal RS may be pulsed while signals GS, RESET, and TX are deasserted (i.e., high gain configuration) in order to read LGS. Pixel reset occurs again at time period $t_9$. During time period $t_9$, signals RESET, TX, and GS may remain asserted until a new pixel exposure and overflow period begins. Deasserting signal GS when LGS is read out ensures that all signals being read from dual gain pixel 200 have the same electrical offset.

It should be noted that no low gain reset voltage is read during the pixel operation of FIG. 9. Instead, a frame buffer may be used to store a calibration voltage CAL that corresponds to the voltage on the floating diffusion node during pixel reset. CAL may be subtracted from LGS during downstream processing to generate a low gain signal. The inclusion of this frame buffer may require additional hardware to be included in the image sensor, but may reduce the number of reads that need to be performed for each captured image.

Figure 10:
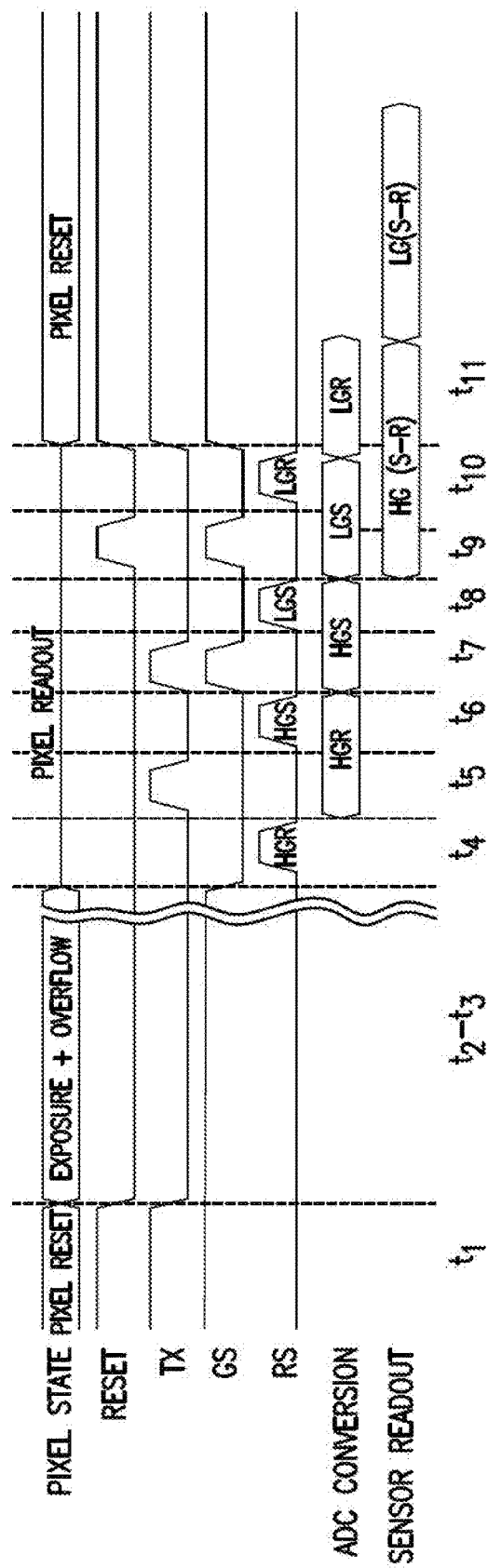
FIG. 10 is a timing diagram illustrating the state of the pixel, the timing of control signals, and the timing of analog-to-digital conversions and sensor readout operations in the circuit of FIG. 3 in an improved four read method of operation in accordance with an embodiment.

FIG. 10 shows a timing diagram for an improved four read method of operation of dual gain pixel 200. The timing diagram of FIG. 10 illustrates the state of pixel 200, the timing of control signals RESET, TX, GS, and RS, and the timing of ADCs and sensor readout operations of the image sensor that contains dual gain pixel 200. Operations of the improved four read method of FIG. 10 that occur during time periods $t_1$-$t_8$ may be substantially the same as those described above in connection with FIG. 9, while ADC conversion operations and sensor readout operations of the improved four read method may be substantially the same as those described above in connection with FIG. 6. Descriptions of these operations are not repeated here for the sake of brevity. In the improved four read method of FIG. 10, pixel readout does not end with the readout of LGS. Instead, at time period $t_9$, signals RESET and GS may be asserted while signals TX, and RS are deasserted in order to reset pixel 200 to voltage Vdd. At time period $t_{10}$, signal RS may be pulsed while signals TX, GS, and RESET are deasserted (i.e., high gain configuration) in order to read out low gain reset voltage LGR. Pixel reset occurs during time period $t_{11}$. During time period $t_{11}$, signals RESET, TX, and GS may remain asserted until a new pixel exposure and overflow period begins. Deasserting signal GS when signals LGS and LGR are read out ensures that all signals being read from dual gain pixel 200 have the same electrical offset.

It should be noted that, in the improved four read method of FIG. 10, low gain signal LG(S-R) may be generated based partly on low gain reset voltage LGR which is read at time $t_{10}$, not based on a stored calibration signal (e.g., signal CAL described above in connection with FIG. 5). This eliminates the need for a frame buffer to store a calibration signal. This method may increase the number of reads required for each captured image, but may not require any additional hardware for a frame buffer.

Figure 11:
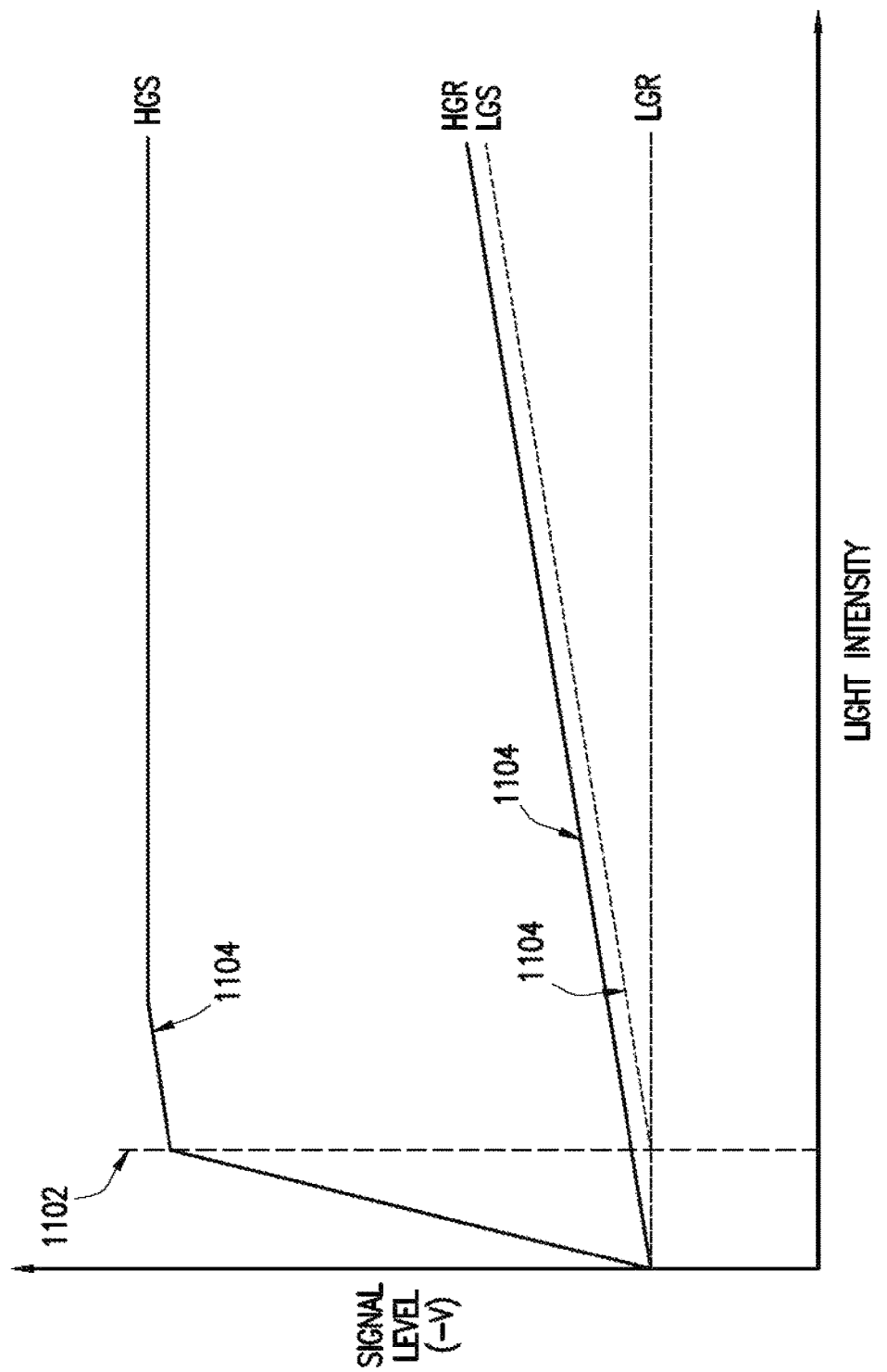
FIG. 11 is a chart illustrating light intensity vs. signal level of pixel output signals corresponding to the improved three/four read method of FIGS. 9 and 10 in accordance with an embodiment.

FIG. 11 is a chart illustrating light intensity vs. signal level (-V) of signals read using the improved three/four read methods of operation of FIGS. 8-10. In the improved three read method of operation of FIGS. 8 and 9, a calibration signal CAL corresponding to voltage 1140 may be stored in a frame buffer instead of reading signal LGR. Signals HGR and LGS and a portion of signal HGS may have the same gradient 1104 for light intensities over level 1102, however signal HGS may become clipped once light intensity is large enough in magnitude to create an HGS signal that is outside of the operating range of analog readout chains in the image sensor. Signals HGS, HGR, LGS, and LGR are read in a high gain configuration. By reading signals HGS, HGR, LGS, and LGR in the same configuration, electrical offset between signals HGS/HGR and signals LGS/LGR is reduced, which decreases the overall voltage range of the read signals. This decrease in electrical offset accomplished by deasserting gain select transistor 206 while signals LGS and LGR are being read (e.g., in contrast with the methods of FIGS. 4-6). Removing this electrical offset reduces the signal range of the readout signals and makes it easier to optimize pixel output signals to fit within the operational signal range of the analog readout chains in the image sensor. This improved readout signal range provides the benefit better signal-to-noise ratio (SNR) for high gain signals HGR and HGS.

Figure 12:
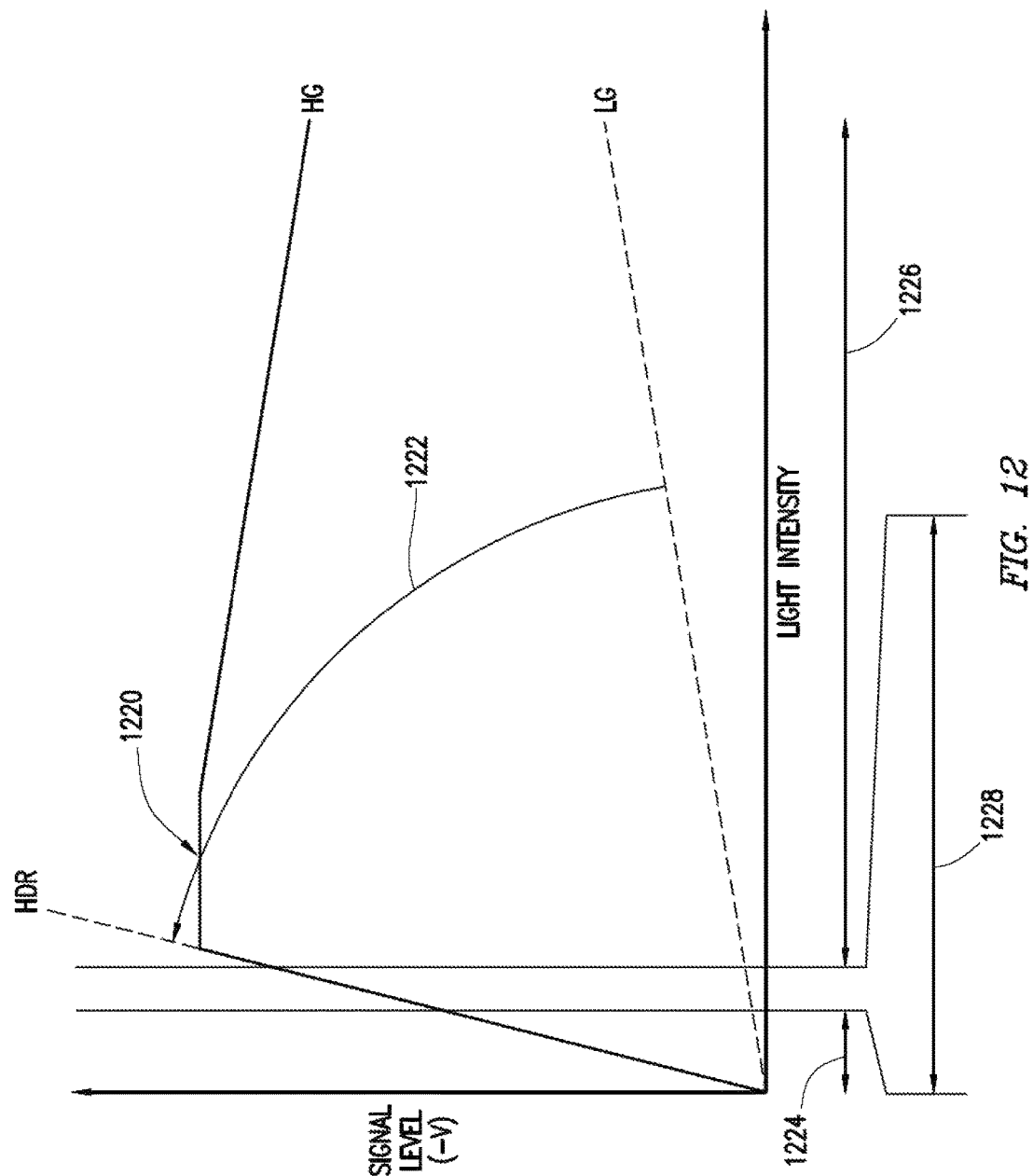
FIG. 12 is a chart illustrating light intensity vs. signal levels of pixel output signals and a method of blending two pixel output signals produce a single linear high dynamic range output signal

FIG. 12 is a chart illustrating light intensity vs. signal level (−V) of pixel output signals and a method of blending two pixel output signals produce a single linear high dynamic range output signal HDR. High gain signal HG corresponds to high gain signal HG(S-R) of FIGS. 5-7. Low gain signal LG corresponds to low gain signal LG(S-R) or LG(S-CAL) of FIGS. 5-7. High dynamic range signal HDR represents the actual signal that is output by the pixel after processing. For light intensities in range 1224, high gain signal HG is output as HDR. For light intensities in range 1226, low gain signal LG is amplified along path 1222 and is then output as HDR. Signal LG is used in range 1226 because this is the range at which signal HG experiences clipping 1220 due to its signal level being outside of the operational range of the analog readout chains.

In blend region 1228, HDR is defined as the sum of a fraction of high gain signal HG and a fraction of the amplified low gain signal LG. For example, HDR may be calculated using equation (1) below, $$HDR=(1-\alpha)(HG)+(\alpha)(G)(LG) \quad \alpha=[0 \ldots 1] \quad (1)$$

where G is the gain ratio between HG and LG that is used to amplify LG, and where α is any desired function (e.g., linear, sigmoid) that ranges from 0 to 1 as light intensity ranges from the start of blend region 1228 to the end of blend region 1228. Transitioning the value of HDR from HG to LG using blending avoids an abrupt increase in noise and prevents errors in the assumed gain difference between HG and LG. This blending only results in a minor non-linearity, compared to the discontinuity created when making a hard switch from HG to LG.

Figure 14:
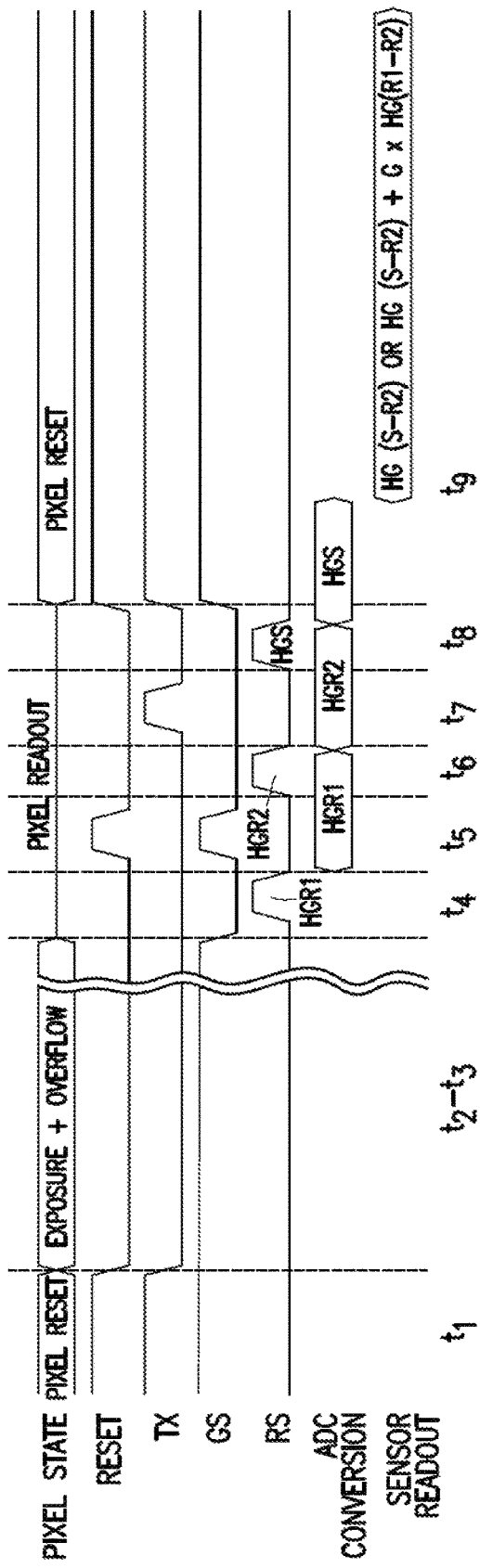
FIG. 14 is a timing diagram illustrating the state of the pixel, the timing of control signals, and the timing of analog-to-digital conversions and sensor readout operations in the circuit of FIG. 3 in an improved three read method of operation that performs three analog-to-digital conversions and that does not require a frame buffer in accordance with an embodiment.

FIG. 13 shows a series of potential diagrams that correspond to potential diagram 230 in FIG. 3 and that illustrate potential levels in dual gain pixel 200 at various time periods during an improved three read, three ADC method of operation of dual gain pixel 200 in both high illumination and low illumination conditions that requires either fewer analog-to-digital conversions or that eliminates the need for a frame buffer. FIG. 14 shows a timing diagram for the improved three read, three ADC method of operation of dual gain pixel 200 of FIG. 13. The timing diagram of FIG. 14 illustrates the state of pixel 200, the timing of control signals RESET, TX, GS, and RS, and the timing of ADCs and sensor readout operations of the image sensor that contains dual gain pixel 200. Operations of the improved three read, three ADC method of FIGS. 13 and 14 that occur during time periods $t_1$-$t_3$ may be substantially the same as those described above in connection with FIG. 5 and descriptions of these operations are not repeated here for the sake of brevity. In the improved three read, three ADC method of FIGS. 13 and 14, all signals may be read out from pixel 200 in high gain configuration. Time periods $t_4$-$t_8$ may correspond to pixel readout. At time period $t_4$, signal RS may be pulsed while signals GS, TX, and RESET are deasserted (i.e., high gain configuration) in order to read first high gain reset voltage HGR1. In low illumination conditions, floating diffusion region 236 will contain little to no charge when HGR1 is read. In high illumination conditions, floating diffusion region 236 will contain charge that overflowed from photodiode region 232 during charge accumulation. At time period $t_5$, signals RESET and GS may be asserted while signals TX and RS are deasserted in order to reset floating diffusion region 236 and gain select region 240 of pixel 200. At time period $t_6$, signal RS may be pulsed while signals GS, TX, and RESET are deasserted (i.e., high gain configuration) in order to read second high gain reset voltage HGR2. At time period $t_7$, signal TX may be asserted while signals GS, RS, and RESET are deasserted in order to transfer any charge remaining in photodiode region 232 to floating diffusion region 236. At time period $t_8$, signal RS may be pulsed while signals GS, TX, and RESET are deasserted (i.e., high gain configuration) in order to read high gain signal voltage HGS. Pixel reset occurs again at time period $t_9$. During time period $t_9$, signals RESET, TX, and GS remain asserted until a new pixel exposure and overflow period begins.

As shown in FIG. 14, three ADCs and one sensor readout operation is performed by the image sensor that contains dual gain pixel 200 for each captured image. HGR1, HGR2, and HGS are each respectively converted from analog to digital signals immediately after being read. Once signals HGR1, HGR2, and HGS have undergone ADC processing, a high dynamic range image signal HDR is generated. HDR is calculated based on equation (2) below when light intensity is below a threshold value, and based on equation (3) below when light intensity is above the threshold value:

$$HDR=HGS-HGR2 \quad (2)$$

$$HDR=HGS-HGR2+G(HGR1-HGR2) \quad (3)$$

where G is the gain ratio between HGR1 after the start of overflow and HGS before the start of overflow, where overflow is defined as starting at a particular light intensity level. HDR signal generation may occur post-processing. It should be noted that the improved three read, three ADC method of FIGS. 13 and 14 uses HGR2 as a reset value, which may serve as a dark offset to ensure low-light low-noise operation. As a result, the improved three read, three ADC method does not require any frame buffer for storing a reset value. This lack of frame buffer results in a reduction in the hardware required for the imaging device, but requires that HGR2 undergo ADC conversion for each captured image.

In some embodiments, a blending method may be used to calculate HDR for light intensities that fall within a range (i.e., blending region) above and below the threshold value using equation (4) below:

$$HDR=HGS-HGR2+(\alpha)(G)(HGR1-HGR2); \alpha=[0 \ldots 1] \quad (4)$$

where α is a function of light intensity having a value that ranges from 0 to 1 across the blending region.

Figure 15:
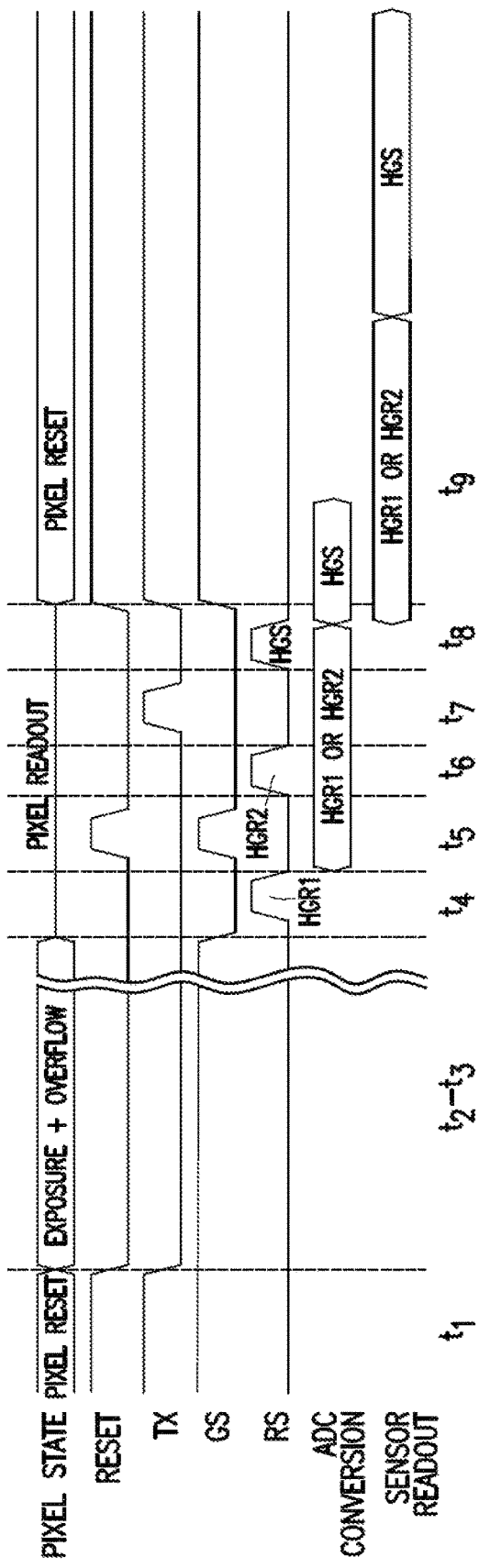
FIG. 15 is a timing diagram illustrating the state of the pixel, the timing of control signals, and the timing of analog-to-digital conversions and sensor readout operations in the circuit of FIG. 3 in an improved three read method of operation that performs two analog-to-digital conversions and that requires a frame buffer in accordance with an embodiment.

FIG. 15 is a timing diagram for an improved three read, two ADC method of operation of dual gain pixel 200. The timing diagram of FIG. 15 illustrates the state of pixel 200, the timing of control signals RESET, TX, GS, and RS, and the timing of ADCs and sensor readout operations of the image sensor that contains dual gain pixel 200. Control signal operations of the improved three read, two ADC method of FIG. 10 that occur during time periods $t_1$-$t_9$ may be substantially the same as those described above in connection with FIG. 14 and are not repeated here for the sake of brevity. Conversely, ADC conversion and sensor readout operations shown in FIG. 15 may differ from those shown in FIG. 14. Instead of performing ADC conversions on both high gain reset signals HGR1 and HGR2, the imaging system may choose to convert either HGR1 or HGR2 after HGR2 is read based on whether light conditions are detected to be above or below a threshold value. If light conditions are below the threshold value, HGR2 may undergo ADC conversion. If light conditions are above the threshold value, HGR1 may undergo ADC conversion. The selected signal HGR1 or HGR2 may be read out after ADC conversion. HGS may undergo ADC conversion after HGS is read regardless of light conditions. HGS may be read out after ADC conversion.

A high dynamic range signal HDR may be generated based on read out signals HGS, HGR1 or HGR2, and a stored calibration value CAL. CAL may correspond to the value of HGR2 would normally have when the image sensor is operated in the dark. CAL may sometimes be referred to as a dark offset calibration voltage. CAL may be stored in a frame buffer in the imaging device. HDR may be generated based on equation (5) below when light intensity is below a threshold value and may be generated based on equation (6) below when light intensity is above a threshold value:

$$HDR=HGS-HGR2 \qquad (5)$$

$$HDR=HGS-CAL+G(HGR1-CAL) \qquad (6)$$

where G is the gain ratio between HGR1 after the start of overflow and HGS before the start of overflow, where overflow is defined as starting at a particular light intensity level. HDR signal generation may occur post-processing. The decision of which formula to apply when generating the HDR signal should be made prior to ADC conversion such that associated decision information is transmitted in parallel with the data converted by the ADC converter. It should be noted that the improved three read, two ADC method of FIG. 15 requires a frame buffer to store calibration value CAL, but requires one fewer ADC conversion per captured image compared to the three read, three ADC method of FIG. 14. This provides the advantage of reduced power consumption as a result of needing fewer ADC conversions per captured image.

Figure 16:
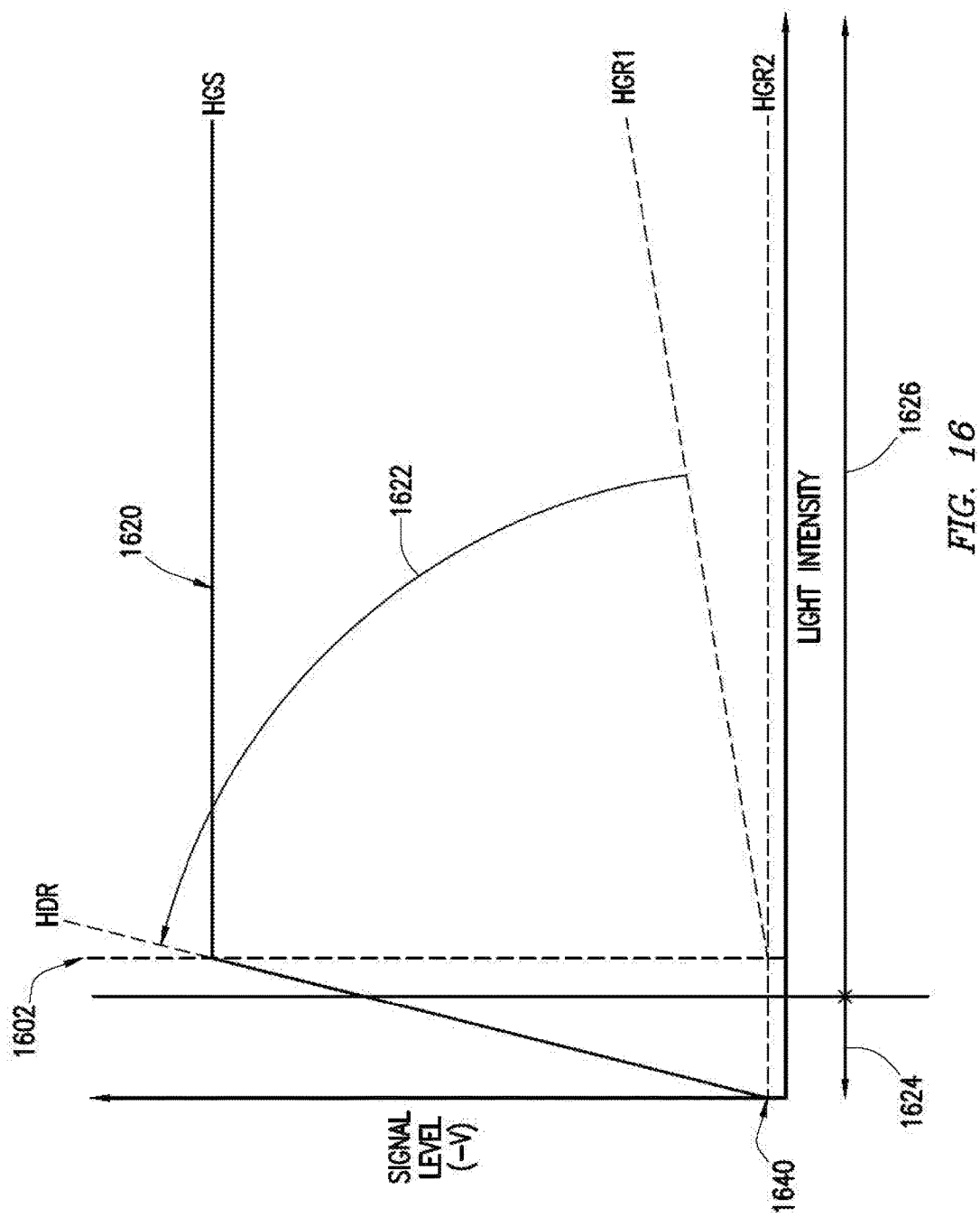
FIG. 16 is a chart illustrating light intensity vs. signal levels of pixel output signals and a method of blending pixel output signals to obtain a linear high dynamic range output signal that optionally includes storing calibration data in a frame buffer in accordance with an embodiment.

FIG. 16 is a chart illustrating light intensity vs. signal level (-V) of pixel output signals and analog decision making for producing a linear high dynamic range output signal HDR. Signals HGS, HGR1, and HGR2 shown in FIG. 16 may correspond to those described in connection with FIGS. 13-15. Saturation point 1620 of HGS may be limited by signal overflow, not by analog readout chain clipping. Overflow begins at light intensity level 1602.

For the three read, three ADC method of FIGS. 13 and 14, at light intensities in region 1624 HDR is calculated using equation (2). At light intensities in region 1626 HDR is calculated using equation (3) where gain ratio G may correspond to path 1622.

Point 1640 represents the light intensity and signal level that corresponds to the calibration signal CAL used in the three read, two ADC method of FIG. 15. For the three read, two ADC method, at light intensities in region 1624 HDR is calculated using equation (5). At light intensities in region 1626 HDR is calculated using equation (6) where gain ratio G may correspond to path 1622.

Various embodiments have been described illustrating an imaging system (e.g., system 100 of FIG. 1) including an imaging system and host subsystems. According to one example, a method of operating an imaging system may include accumulating charge in response to incident light with a photodiode in a pixel, reading out a first signal with readout circuitry while the pixel is in a high gain configuration where the first signal is based on a first portion of the accumulated charge that overflows from the photodiode into a floating diffusion node and a gain select storage node, transferring a second portion of the accumulated charge remaining in the photodiode to the floating diffusion node while the pixel is in the high gain configuration with a transfer transistor, reading out a second signal with the readout circuitry while the pixel is in the high gain configuration where the second signal is based on the first and second portions of the accumulated charge at the floating diffusion node, asserting a gate signal for a gain select transistor to distribute the first and second portions of the accumulated charge between the floating diffusion node and the gain select storage node, and reading out a third signal with the readout circuitry while the pixel is in the high gain configuration where the third signal is based on the distributed charge at the floating diffusion node. Reading out the third signal while the pixel is in the high gain configuration may include deasserting the gate signal for the gain select transistor and reading out a third signal while the gate signal of the gain select transistor is deasserted such that the floating diffusion node is electrically isolated from the gain select storage node with the readout circuitry where the third signal is based on the distributed charge at the floating diffusion node. The gain selector may be interposed between the floating diffusion node and the gain select storage node. The pixel may be a dual gain pixel. The method may further include resetting the pixel by resetting the floating diffusion node and the gain select storage node to a pixel voltage and reading out a fourth signal based on the pixel voltage at the floating diffusion node in the high gain configuration with readout circuitry after resetting the pixel.

According to another example, a method of operating an image system may include with a photodiode in a dual gain pixel, accumulating charge in response to incident light, reading out a first signal with readout circuitry while the pixel is in a high gain configuration where the first signal is based on a first portion of the accumulated charge that overflows from the photodiode into a floating diffusion node and a gain select storage node, resetting the floating diffusion node and a gain select storage region to a pixel voltage after reading out the first signal, reading out a second signal with the readout circuitry while the pixel is in the high gain configuration where the second signal is based on the pixel voltage at the floating diffusion node, transferring a second portion of the accumulated charge from the photodiode to the floating diffusion node in the high gain configuration with a transfer transistor, reading out a third signal with the readout circuitry while the pixel is in the high gain configuration where the third signal based on the second portion of the accumulated charge at the floating diffusion node. The high gain configuration may include deasserting a gain signal for a gain select transistor to isolate the floating diffusion node from the gain select storage region.

In some embodiments, the method may further include storing a dark offset calibration voltage with a frame buffer, performing analog to digital conversion on a selected one of the first and second signals based on a detected light condition, and performing analog to digital conversion on the third signal.

In some embodiments, performing analog to digital conversion on a selected one of the first and second signals based on a detected light condition may include performing analog to digital conversion on the first signal in response to detecting that light intensity is above a threshold value. The method may further include amplifying the first signal by a gain ratio between the third signal and the first signal, and generating a high dynamic range image signal based on the amplified first signal, the calibration voltage, and the third signal.

In some embodiments, performing analog to digital conversion on a selected one of the first and second signals based on a detected light condition may include performing analog to digital conversion on the second signal in response to detecting that light intensity is below a threshold value. The method may further include generating a high dynamic range image signal based on the difference between the third signal and the second signal.

In some embodiments, the method may further include performing analog to digital conversion on the first, second, and third signals.

In some embodiments, the method may include generating a high dynamic range image signal based on the difference between the third signal and the second signal in response to detecting that light intensity is below a threshold value.

In some embodiments, the method may include amplifying the first signal by a gain ratio between the third signal and the first signal and generating a high dynamic range image signal based on an amplified first signal, and the second and third signals.

According to another example, a method of operating an imaging system may include reading a first reset signal from a dual gain pixel when the dual gain pixel is in a high gain configuration where the first reset signal is based on overflow charge in a floating diffusion node of the dual gain pixel, resetting the floating diffusion node and a gain select storage region to a reset voltage, reading a second reset signal from the dual gain pixel when the dual gain pixel is in the high gain configuration where the second reset signal is based on the reset voltage at the floating diffusion node, and reading a first high gain signal from the dual gain pixel when the dual gain pixel is in the high gain configuration.

In some embodiments, the method may further include storing a dark offset calibration value in a frame buffer, performing analog to digital conversion on a selected one of the first and second reset signals based on a detected light condition, and generating a high dynamic range image based on the selected one of the first and second reset signals and the high gain signal.

In some embodiments, the method may further include performing analog to digital conversion on the first and second reset signals and on the high gain signal, and generating a high dynamic range image based on the first and second reset signals and the high gain signal The foregoing is merely illustrative of the principles of this invention and various modifications can be made by those skilled in the art without departing from the scope and spirit of the invention. The foregoing embodiments may be implemented individually or in any combination.

What is claimed is:

1. A method of operating an imaging system, comprising:
   with a photodiode in a pixel, accumulating charge in response to incident light;
   with readout circuitry, reading out a first signal while the pixel is in a high gain configuration, wherein the first signal is based on a first portion of the accumulated charge that overflows from the photodiode into a floating diffusion node and a gain select storage node
   with a transfer transistor, transferring a second portion of the accumulated charge remaining in the photodiode to the floating diffusion node while the pixel is in the high gain configuration;
   with the readout circuitry, reading out a second signal while the pixel is in the high gain configuration, wherein the second signal is based on the first and second portions of the accumulated charge at the floating diffusion node;
   asserting a gate signal for a gain select transistor to distribute the first and second portions of the accumulated charge between the floating diffusion node and a gain select storage node; and
   with the readout circuitry, reading out a third signal while the pixel is in the high gain configuration, wherein the third signal is based on the distributed charge at the floating diffusion node, wherein reading out the third signal while the pixel is in the high gain configuration comprises:
      deasserting the gate signal for the gain select transistor, and
      with the readout circuitry, reading out a third signal while the gate signal of the gain select transistor is deasserted such that the floating diffusion node is electrically isolated from the gain select storage node, wherein the third signal is based on the distributed charge at the floating diffusion node.

2. The method defined in claim 1, wherein the gain select transistor is interposed between the floating diffusion node and the gain select storage node.

3. The method defined in claim 1, wherein the pixel is a dual gain pixel.

4. The method defined in claim 1, further comprising:
   resetting the pixel by setting the floating diffusion node and the gain select storage node to a pixel voltage.

5. The method defined in claim 4, further comprising:
   after resetting the pixel, with readout circuitry, reading out a fourth signal while the pixel is in the high gain configuration, wherein the fourth signal is based on the pixel voltage at the floating diffusion node.

6. A method of operating an imaging system, comprising:
   with a photodiode in a dual gain pixel, accumulating charge in response to incident light;
   with readout circuitry, reading out a first signal while the dual gain pixel is in a high gain configuration, wherein the first signal is based on a first portion of the accumulated charge that overflows from the photodiode into a floating diffusion node and a gain select storage node;
   after reading out the first signal, resetting the floating diffusion node and a gain select storage region to a pixel voltage;
   with the readout circuitry, reading out a second signal while the dual gain pixel is in the high gain configuration, wherein the second signal is based on the pixel voltage at the floating diffusion node;
   with a transfer transistor, transferring a second portion of the accumulated charge from the photodiode to the floating diffusion node while the dual gain pixel is in the high gain configuration;
   with the readout circuitry, reading out a third signal while the dual gain pixel is in the high gain configuration, wherein the third signal is based on the second portion of the accumulated charge at the floating diffusion node and wherein the high gain configuration comprises deasserting a gate signal for a gain select transistor to isolate the floating diffusion node from the gain select storage region.

7. The method defined in claim 6, further comprising:
with a frame buffer, storing a dark offset calibration voltage.

8. The method defined in claim 7, further comprising:
performing analog to digital conversion on a selected one of the first and second signals based on a detected light condition; and
performing analog to digital conversion on the third signal.

9. The method defined in claim 8, wherein performing analog to digital conversion on the selected one of the first and second signals based on the detected light condition further comprises:
performing analog to digital conversion on the first signal in response to detecting that light intensity is above a threshold value.

10. The method defined in claim 9, further comprising:
amplifying the first signal by a gain ratio between the third signal and the first signal; and
generating a high dynamic range image signal based on the amplified first signal, the calibration voltage, and the third signal.

11. The method defined in claim 8, wherein performing analog to digital conversion on the selected one of the first and second signals based on the detected light condition further comprises:
performing analog to digital conversion on the second signal in response to detecting that light intensity is below a threshold value.

12. The method defined in claim 11, further comprising:
generating a high dynamic range image signal based on the difference between the third signal and the second signal.

13. The method defined in claim 6, further comprising:
performing analog to digital conversion on the first, second, and third signals.

14. The method defined in claim 13, further comprising:
generating a high dynamic range image signal based on the difference between the third signal and the second signal in response to detecting that light intensity is below a threshold value.

15. The method defined in claim 13, further comprising:
amplifying the first signal by a gain ratio between the third signal and the first signal; and
generating a high dynamic range image signal based on an amplified first signal, and the second and third signals.

16. A method of operating an imaging system comprising:
reading a first reset signal from a dual gain pixel when the dual gain pixel is in a high gain configuration, wherein the first reset signal is based on overflow charge in a floating diffusion node of the dual gain pixel;
resetting the floating diffusion node and a gain select storage region to a reset voltage;
reading a second reset signal from the dual gain pixel when the dual gain pixel is in the high gain configuration, wherein the second reset signal is based on the reset voltage at the floating diffusion node;
reading a first high gain signal from the dual gain pixel when the dual gain pixel is in the high gain configuration;
performing analog to digital conversion on the first and second reset signals and on the high gain signal; and
generating a high dynamic range image based on the first and second reset signals and the high gain signal.

17. The method defined in claim 16, further comprising:
storing a dark offset calibration value in a frame buffer.

* * * * *